United States Patent [19]
Kato et al.

[11] Patent Number: 5,679,099
[45] Date of Patent: Oct. 21, 1997

[54] APPARATUS FOR CONTROLLING SLIP AMOUNT OF MOTOR VEHICLE CLUTCH DURING VEHICLE STARTING

[75] Inventors: Shogo Kato, Nagoya; Koichi Sugihara, Aichi-ken; Yasuji Taketsuna, Okazaki; Tomoyuki Maeda, Toyota, all of Japan

[73] Assignee: Toyota Jidosha Kabushiki Kaisha, Toyota, Japan

[21] Appl. No.: 541,700

[22] Filed: Oct. 10, 1995

[30] Foreign Application Priority Data

Oct. 21, 1994 [JP] Japan ................... 6-256391

[51] Int. Cl.$^6$ ................................. B60K 41/02
[52] U.S. Cl. ............... 477/176; 477/70; 192/54.3
[58] Field of Search .................. 477/70, 166, 174, 477/175, 176; 192/54.3, 103 F

[56] References Cited

U.S. PATENT DOCUMENTS

| | | | |
|---|---|---|---|
| 4,766,544 | 8/1988 | Kurihara et al. | 477/176 X |
| 5,050,714 | 9/1991 | Kurihara et al. | 477/176 |
| 5,056,639 | 10/1991 | Petzold et al. | 477/176 |
| 5,067,599 | 11/1991 | Roder et al. | 477/176 |
| 5,275,267 | 1/1994 | Slicker | 477/176 |
| 5,322,150 | 6/1994 | Schmidt-Brucken et al. | 477/176 |
| 5,378,211 | 1/1995 | Slicker et al. | 477/176 X |
| 5,403,249 | 4/1995 | Slicker | 477/176 |
| 5,491,635 | 2/1996 | Foeldi et al. | 477/176 |

*Primary Examiner*—Charles A. Marmor
*Assistant Examiner*—Saul Rodriguez
*Attorney, Agent, or Firm*—Oblon, Spivak, McClelland, Maier & Neustadt, P.C.

[57] ABSTRACT

An apparatus for controlling a clutch of a motor vehicle connected to an engine and having a driving and a driven rotating member. The apparatus is capable of controlling an amount of slip of the clutch during starting of the vehicle. The apparatus includes: an engine torque determining device for determining a torque of the engine; a clutch speed monitoring device for determining whether a speed of the driven rotating member has been raised to a level substantially equal to a speed of the engine; a first slip control device for controlling the amount of slip of the clutch such that a clutch torque to be transmitted through the clutch is smaller than the engine torque by a predetermined amount, before the clutch speed monitoring device determines that the speed of the driven rotating member has been raised to the level equal to the engine speed; and a fully engaging device for fully engaging the clutch when the clutch speed monitoring device determines that the speed of the driven rotating member has been raised to the level.

11 Claims, 6 Drawing Sheets

APPARATUS FOR CONTROLLING SLIP AMOUNT OF MOTOR VEHICLE CLUTCH DURING VEHICLE STARTING

BACKGROUND OF THE INVENTION

1. Field of the Invention

The present invention relates to an apparatus for controlling a clutch of a motor vehicle, which clutch is adapted to transmit an engine output to a drive line of the vehicle and cut the transmission of the engine output. More particularly, the invention is concerned with a technique for controlling the amount of slip or partial engagement of the clutch at the time of or during starting of the vehicle.

2. Discussion of the Prior Art

A clutch of a motor vehicle is adapted to transmit an engine output to a drive line of the vehicle and to cut the transmission of the engine output to the drive line. The clutch is placed in its fully released state upon or during stopping of the vehicle or shifting of a transmission for disconnecting the vehicle engine from the drive line, and is placed in its fully engaged state during steady running of the vehicle for transmitting the engine output to the drive line. Generally, a clutch torque which can be transmitted to the drive line through the clutch in the engaged state is larger than a torque that can be generated by the engine. In other words, the generated engine torque can be transmitted to the drive line (which includes a speed changing device) with high stability. The speed changing device may be an automatic transmission (A/T) which is automatically shifted to a desired gear position. In some motor vehicle equipped with such an automatic transmission, an automatically controlled clutch is used in place of a torque convertor. The automatically controlled clutch is automatically engaged and released as needed. Where the automatically controlled clutch is used with a manual transmission (M/T), a vehicle operator simply manipulates a shift lever, and does not operate the clutch. U.S. Pat. No. 4,401,199 (JP-A-56-131430) discloses one type of a clutch whose amount of slip is also automatically controllable. As examples of such automatically controlled clutch of the motor vehicle, there are known a friction clutch and an electromagnetic clutch, for instance. The friction clutch has friction members which are forced against each other by a hydraulic pressure or spring force, so as to transmit a torque through the friction members by a friction force. The electromagnetic clutch transmits a torque by an electromagnetic force.

If the amount of slip of the clutch is controlled during starting of the vehicle such that the clutch torque is larger than the engine torque, the engine speed is temporarily lowered, deteriorating driving comfort, and drivability or acceleration performance of the vehicle. If the amount of slip of the clutch is controlled during running of the vehicle under a large running load (e.g., running on an uphill road), the engine speed tends to be lowered continuously, leading to unstable engine operation or engine stalling.

In view of this drawback, U.S. Pat. No. 4,986,396 (JP-A-1-195142) proposes a technique for controlling the slip amount of a clutch such that the actual speed of the engine substantially coincides with a target engine speed obtained on the basis of a throttle valve opening angle. This arrangement is effective to avoid the engine stalling. However, since the engine speed is kept at a substantially constant level until the speed of the driven rotating member of the clutch (i.e., the speed of the input shaft of the transmission) reaches the engine speed, the arrangement is not capable of completely eliminating the problems indicated above. Since the engine speed is kept constant, the speed of the driven rotating member of the clutch is not raised to a sufficient extent if the engine torque is not large enough. Further, the starting performance of the vehicle is significantly deteriorated due to the slipping of the clutch when the vehicle is running with a relatively large load or resistance. If the clutch is held in a slipping or partially engaged state (controlled in the slip control mode) for a relatively long time, the service life of the clutch is reduced due to heat generated during the slipping.

SUMMARY OF THE INVENTION

It is therefore a principal object of the present invention to provide an apparatus for controlling a clutch of a motor vehicle, which assures excellent starting performance while eliminating poor vehicle drivability and driving discomfort during starting of the vehicle.

It is a first optional object of the invention to provide an apparatus for controlling a motor vehicle clutch which does not suffer from considerable deterioration in the starting performance and durability of the clutch due to heat, which would result from slipping of the clutch while the vehicle is running with a relatively large load or resistance.

Further, it is a second optional object of the invention to provide a clutch control apparatus which is capable of avoiding engine troubles which would arise from excessive drop of the engine speed when the clutch is partially engaged such that the clutch torque is larger than the engine torque during vehicle running under a large running load or resistance.

The above principal object may be achieved according to a principle of the present invention which provides an apparatus for controlling a clutch of a motor vehicle connected to an engine and having a driving and a driven rotating member for transmitting and cutting an output of the engine, the apparatus being capable of controlling an amount of slip of the clutch during starting of the vehicle, the apparatus comprising: engine torque determining means for determining a torque of the engine; clutch speed monitoring means for determining whether a speed of the driven rotating member has been raised to a level substantially equal to a speed of the engine; first slip control means for controlling the amount of slip of the clutch such that a clutch torque to be transmitted through the clutch is smaller than the engine torque by a predetermined amount, before the clutch speed monitoring means determines that the speed of the driven rotating member has been raised to the level equal to the speed of the engine; and fully engaging means for fully engaging the clutch when the clutch speed monitoring means determines that the speed of the driven rotating member has been raised to the level.

In the clutch controlling apparatus constructed as described above, the amount of slip or engagement of the clutch is controlled by the first slip control means such that the clutch torque to be transmitted to the drive line of the vehicle is smaller than the engine torque by the predetermined amount before the clutch speed monitoring means determines that the speed of the driven rotating member has been raised to a level substantially equal to the engine speed. In this case, since the torque transmitted through the clutch (clutch torque) is smaller than the torque generated by the engine, the engine speed continues to rise regardless of the slipping engagement of the clutch while a portion of the engine torque (which corresponds to the clutch torque) is transmitted to the driven rotating member via the clutch, so that the speed of the driven rotating member is raised in accordance with the clutch torque. When the clutch speed monitoring means determines that the speed of the driven rotating member substantially reaches the engine speed, the clutch is fully engaged by the fully engaging means. Thereafter, the driven rotating member of the clutch is rotated with the engine at the same speed.

It is noted that the above-indicated predetermined amount or torque difference corresponds to a desired acceleration rate of the engine, and may be determined to be a constant value, or a value which varies as a function of the engine torque, so that the speed of the driven rotating member of the clutch is rapidly increased up to the engine speed while the engine speed is increased during a normal running of the vehicle, e.g., running on a generally flat road surface. Alternatively, the predetermined torque difference may be determined on the basis of suitable parameters indicative of the running conditions of the vehicle, such as the engine torque, throttle valve opening angle, engine speed, vehicle speed, weight of the vehicle and gradient of the road surface. The torque difference may be varied from time to time during the slipping engagement of the clutch on the basis of suitable parameters, such as time duration during which the clutch is controlled in slip control mode, acceleration of the engine or the driven rotating member of the clutch.

In the clutch controlling apparatus constructed as described above, the torque generated by the engine, i.e., engine torque, is suitably transmitted by the clutch so as to increase the engine speed and the speed of the driven rotating member of the clutch. Thus, the present arrangement is effective to eliminate the poor vehicle drivability and driving discomfort during starting of the vehicle, assuring improved starting performance of the vehicle. In particular, in the present invention, the torque which is transmitted via the clutch, i.e., clutch torque, is controlled on the basis of the engine torque, and therefore, both the engine speed and the speed of the driven rotating member of the clutch are appropriately increased with a better balance, than in a case wherein the amount of slip of the clutch is controlled such that the engine speed is increased at a predetermined acceleration rate.

The first optional object indicated above may be achieved according to a first preferred arrangement of the invention, wherein the apparatus further comprises: time lapse determining means for determining whether a predetermined time has passed after an operation of the first slip control means is initiated; and second slip control means for controlling the amount of slip of the clutch such that the clutch torque is larger than the engine torque by a predetermined amount when the time lapse determining means determines that the predetermined time has passed.

In this first preferred arrangement of the invention, when the time lapse determining means determines that the predetermined time has passed after the operation of the first slip control means is initiated, the second -slip control means controls the clutch to be partially engaged such that the clutch torque is larger than the engine torque by the predetermined amount. When the rate of increase in the speed of the driven rotating member of the clutch is low while the vehicle is running under a large running resistance or load, for example, the speed of the driven rotating member does not reach the engine speed even when the predetermined time has passed after the operation of the first slip control means is initiated. In this case, the clutch torque is made larger than the engine torque by a predetermined amount by the second slip control means, so that the torque transmitted to the driven rotating member of the clutch is increased, and the speed of the driven rotating member is accordingly increased. Since the torque transmitted through the clutch is made larger than the engine torque, the engine speed is lowered. However, the engine speed has been raised to a certain extent during the slip control operation of the clutch by the first slip control means, and therefore the present arrangement does not suffer from engine troubles such as engine stalling immediately after the engine speed is lowered. When the clutch speed monitoring means determines that the speed of the driven rotating member is substantially equal to the engine speed as a result of an increase in the speed of the driven rotating member and a decrease in the engine speed, the clutch is brought to the fully engaged state by the fully engaging means. Thereafter, the driving and driven rotating members of the clutch are rotated with the engine at the same speed.

In the present arrangement, the predetermined time before the second slip control means is activated to start controlling the amount of slip or partial engagement of the clutch may be a constant value, which is determined so as to avoid reduction in the life expectancy of the clutch due to heat caused by friction, considerable deterioration in the starting performance of the vehicle, and engine overrun (seizure of the engine) due to excessive rise of the engine speed. Alternatively, the predetermined time may be determined on the basis of suitable parameters, such as the clutch torque or a slip ratio during the slipping or partial engagement of the clutch. The present arrangement may be modified such that the second slip control means is activated even before expiration of the predetermine time, if a predetermined condition is satisfied. For instance, the second slip control means may be activated immediately after the engine speed exceeds a predetermined upper limit.

According to the present arrangement, the amount of slip of the clutch is controlled by the second slip control means such that the clutch torque is larger than the engine torque by the predetermined amount. In this case, the predetermined amount corresponds to a desired engine deceleration rate, so that the acceleration of the driven rotating member of the clutch is increased at a rate corresponding to the desired deceleration rate of the engine speed. The predetermined amount or torque difference may be a constant value, or a value which varies as a function of the engine torque, so that the speed of the driven rotating member of the clutch is rapidly increased to the engine speed during vehicle running under a large running resistance or load (e.g., running on an uphill road surface). Alternatively, the predetermined torque difference may be determined on the basis of suitable parameters indicative of various operating conditions of the vehicle, such as the engine torque, throttle valve opening angle, engine speed, vehicle speed, weight of the vehicle and gradient of the road surface. The torque difference may be continuously varied during the slip control of the clutch, depending upon a suitable parameter, such as a time duration during which the clutch is held in the partially engaged state, acceleration of the engine or the driven rotating member.

In the above arrangement, the first slip control means and the second slip control means may be constructed independently of each other, so that the first and second slip control means control the clutch torque differently as explained above. However, the first and second slip control means may be constituted by common slip control means and torque changing means. The common slip control means is adapted to change a drive force for engagement of the clutch, or the pressure in a hydraulic cylinder for operating the clutch. In this case, the drive force or hydraulic pressure is obtained from a suitable equation which includes the clutch torque as a parameter, for example. The torque changing means is adapted to change the clutch torque, depending upon whether the speed of the driven rotating member of the clutch has been raised to the engine speed, and depending upon whether the predetermined time has passed after the operation to control the amount of the clutch is initiated.

According to the present first preferred arrangement of the invention, the clutch is partially engaged by the second slip control means in place of the first slip control means when the predetermined time has passed after the control of the clutch is initiated by the first slip control means during vehicle running under a large running resistance or load (e.g., vehicle running on an uphill road surface). The second slip control means effects the partial engagement of the clutch such that the clutch torque is larger than the engine torque. Accordingly, the speed of the driven rotating member of the clutch is rapidly increased while the engine speed is lowered, whereby the clutch is fully engaged as quickly as possible. Thus, this arrangement is effective to reduce the conventionally experienced poor starting of the vehicle on an uphill road, and assures improved starting drivability of the vehicle. Since the second slip control means enables the clutch to be placed in the fully engaged state as quickly as possible after the predetermined time has passed, the clutch is not likely to suffer from deterioration in durability thereof which would result from frictional heat due to the slipping engagement of the clutch. Furthermore, since the engine speed is lowered by the second slip control means, the overrun of the engine is effectively avoided.

The second optional object indicated above may be achieved according to a second preferred arrangement of the invention wherein the apparatus further comprises: engine speed monitoring means for determining whether the speed of the engine has been lowered below a predetermined lower limit while the clutch is controlled by the second slip control means; and third slip control means for controlling the amount of slip of the clutch such that the clutch torque is substantially equal to the engine torque after the engine speed monitoring means determines that the speed of the engine has been lowered below the predetermined lower limit.

In this second preferred arrangement of the invention, when the engine speed monitoring means determines that the speed of the engine has been lowered below the predetermined lower limit while the clutch is controlled by the second slip control means, the third slip control means controls the clutch to be partially engaged such that the clutch torque is substantially equal to the engine torque. Described more specifically, while the vehicle is running under a considerably large running resistance or load (e.g., running on a steep uphill road surface), the speed of the driven rotating member of the clutch is not likely to rapidly rise even if the second slip control means is operated such that the clutch torque is larger than the engine torque as described above. In this case, the engine speed will continue to be lowered, and the vehicle may suffer from the engine troubles such as unstable engine operation or engine stall due to the excessively lowered engine speed. In the present arrangement, however, when the engine speed is lowered down to the predetermined lower limit, the third slip control means starts controlling the amount of slip of the clutch such that the clutch torque is substantially equal to the engine torque, to thereby prevent the engine speed from dropping below the lower limit. If the clutch torque is substantially equal to the engine torque, this means that the engine acceleration is zero, in other words, the engine speed is kept at a substantially constant level. Thus, the present arrangement is effective to avoid occurrence of the engine stall resulting from continuous lowering of the engine speed from the lower limit.

The lower limit of the engine speed is determined to be as low as possible so that the vehicle does not suffer from unstable engine operation or stalling, while taking account of a detecting error of the engine speed sensor or the operating characteristics of the specific engine. In this respect, it is desirable to determine the lower limit of the engine speed according to a suitable formula or a data map which includes a parameter indicative of a load acting on the engine, such as the throttle valve opening angle or the intake air quantity.

In the above arrangement, the first, second and third slip control means may be constructed independently of each other, so that these slip control means control the clutch torque differently as described above. However, these three slip control means may be constituted by common slip control means and torque changing means. The common slip control means is adapted to change a drive force for engagement of the clutch, or the pressure in a hydraulic cylinder for operating the clutch. In this case, the drive force or hydraulic pressure is obtained from a suitable equation which includes the clutch torque as a parameter, for example. The torque changing means is adapted to change the clutch torque, depending upon whether the speed of the driven rotating member of the clutch has been raised to the engine speed, whether the predetermined time has passed after the operation to control the amount of the clutch is initiated, and whether the engine speed has been lowered below the lower limit.

In the present second preferred arrangement of the invention, if the speed of the driven rotating member of the clutch does not rise rapidly and the engine speed continues to be lowered to the lower limit even if the second slip control means controls the clutch such that the clutch torque is larger than the engine torque, the third slip control means controls the clutch to be partially engaged such that the clutch torque is substantially equal to the engine torque. This arrangement prevents the engine speed from being lowered below the lower limit, whereby the vehicle does not suffer from the engine troubles as described above.

According to a third preferred arrangement of the invention, the apparatus further comprises: target engine acceleration calculating means for calculating a target acceleration of the engine on the basis of the engine torque and the clutch torque; actual engine acceleration obtaining means for obtaining an actual acceleration of the engine; and adjusting means for adjusting a drive force for partially engaging the clutch, so as to zero an error between the target acceleration and the actual acceleration of the engine.

In the third preferred arrangement of the invention, the target engine acceleration is calculated by the target engine acceleration calculating means on the basis of the engine torque and the clutch torque while the actual engine acceleration is obtained by the actual engine acceleration obtaining means. Further, the adjusting means adjusts the drive force by which the clutch is placed in the slipping or partially engaged state under the control of the corresponding one of the first through third slip control means, so as to zero the error between the target engine acceleration and the actual engine acceleration. Where the clutch is a friction clutch adapted to be engaged by a hydraulic actuator, the adjusting means adjusts the pressure of the hydraulic actuator so as to zero the engine acceleration error. Namely, the drive force for the slipping engagement of the clutch is adjusted by the appropriate slip control means, depending on the clutch torque which is determined on the basis of a predetermined relationship between the clutch torque and the drive force. However, the clutch torque and the drive force do not necessarily correlate to each other with high accuracy due to dimensional errors of various components and a variation in the operating characteristics of the specific engine. In this case, the clutch torque deviates from a desired value, and accordingly, the engine torque is not appropriately controlled. In the present arrangement, the target engine acceleration is calculated on the basis of the engine torque obtained by the engine torque obtaining means and the clutch torque which is used by the slip control means to determine the drive force. The present arrangement is adapted to adjust the drive force for the slipping engagement of the clutch such that the actual engine acceleration coincides with the calculated target engine acceleration. Described more specifically, the drive force for the slipping engagement of the clutch is made smaller when the actual engine acceleration is lower than the target engine acceleration, while the drive force is made larger when the actual engine acceleration is larger than the target engine acceleration. According to this arrangement, even if the relationships between the clutch torque and the drive force which are used by the respective slip control means contain some error, the drive force for the slipping engagement of the clutch is suitably adjusted to satisfy a suitable relationship between the clutch torque and the engine torque, in other words, to provide a suitable difference between the engine torque and the clutch torque. Consequently, the engine torque is appropriately adjusted while ensuring that the clutch is partially engaged so as to transmit a desired torque to the drive line of the vehicle.

It may be difficult for the engine torque obtaining means to obtain the engine torque with high accuracy. If the clutch torque is controlled based on the engine torque which contains an error, a torque used for driving the engine, in other words, a torque difference between the actual engine torque and the clutch torque is comparatively small. Accordingly, the clutch torque is almost equal to the engine torque. In this case, the error in the engine torque is almost equal to the error in the clutch torque, which makes it difficult to obtain desired values of the engine acceleration and the acceleration of the driven rotating member of the clutch. However, the present arrangement is adapted to control the drive force for the slipping engagement of the clutch such that the actual engine acceleration coincides with the target engine acceleration, whereby the torque difference between the actual engine torque and the clutch torque is adjusted so as to correspond to the target engine acceleration. The clutch torque contains the error in accordance with the error in the target engine acceleration, depending on the error in the detected engine torque. However, since the ratio of the engine torque which contributes to the rotation of the engine speed with respect to the actual overall engine torque is extremely small, the error included in the detected engine torque does not give a substantial influence on the target engine acceleration.

Generally, it is rather difficult to accurately control the clutch due to the error in the detected engine torque and the error in determining the relationships between the clutch torque and the clutch drive force. In the present third preferred arrangement of the invention, however, the drive force for the slipping engagement of the clutch is adjusted so as to satisfy the predetermined relationship between the engine torque and the clutch torque, in other words, so as to establish the desired torque difference between the engine torque and the clutch torque. Thus, the present arrangement is capable of controlling the clutch torque with high accuracy irrespective of the error in the detected engine torque and the error in determining the relationship between the clutch torque and the engine torque, to thereby assure the desired slip control operation of the clutch.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE EMBODIMENT

Figure 1:
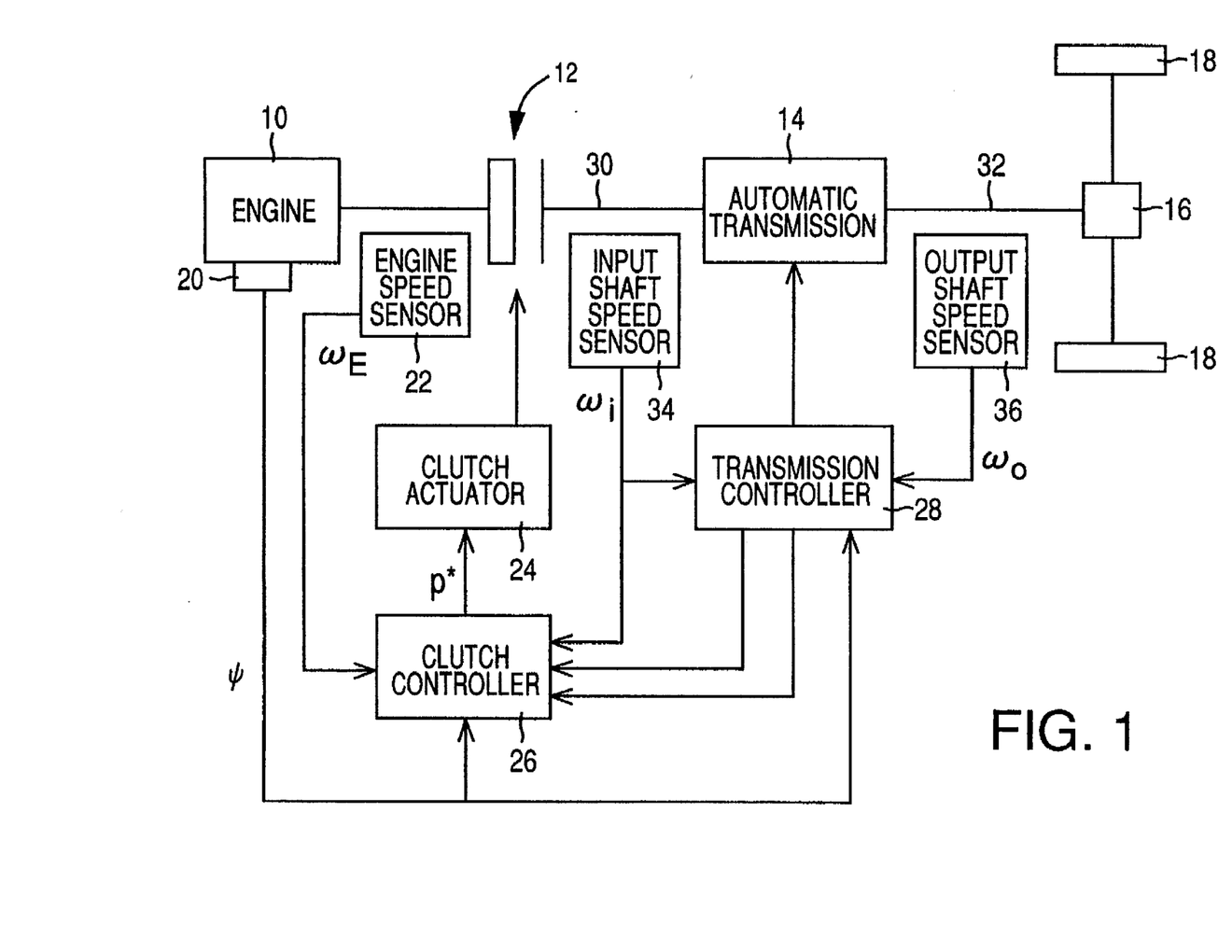
FIG. 1 is a view schematically showing a motor vehicle equipped with a clutch control apparatus according to one embodiment of the invention.

Referring first to FIG. 1, there is schematically shown a motor vehicle which incorporates a clutch control apparatus constructed according to one embodiment of the present invention. A torque generated by an engine 10 is transmitted to an automatic transmission 14 via an electrically controlled clutch 12, and is distributed to left and right drive wheels 18 through a differential gear device 16. An intake air quantity of the engine 10 is controlled by a throttle valve which is operated by an accelerator pedal not shown. An output of the engine 10 is increased or decreased in accordance with the intake air quantity. The engine 10 has a throttle sensor 20 for detecting an opening angle $\psi$ of the throttle valve, and an engine speed sensor 22 for detecting a speed $\omega E$ of the engine 10. The throttle sensor 20 is provided with an idling position switch adapted to generate an idling signal when the throttle valve is placed in an idling position near the fully closed position. The clutch 12 is adapted to transmit the engine output to a drive line of the vehicle when two friction members of the clutch 12 are held in mutually pressing engagement with each other by a clutch actuator 24. On the other hand, the clutch 12 is adapted to cut the transmission of the engine output to the drive line when the friction members are disengaged from each other. The two friction members act as a driving rotating member connected to the engine 10 and a driven rotating member connected to the automatic transmission 14. The clutch actuator 24 includes a hydraulic cylinder for pressing the friction members of the clutch 12 against each other, and drive force adjusting means in the form of an electromagnetic pressure control valve for controlling a pressure $P_{CL}$ in the hydraulic cylinder (hereinafter referred to as "clutch cylinder"). The clutch pressure $P_{CL}$ is adjusted by a clutch controller 26 so that a clutch torque $T_{CL}$ to be transmitted through the clutch 12 corresponds to the clutch pressure $P_{CL}$. It is noted that the clutch pressure $P_{CL}$ corresponds to a drive force by which the friction members of the clutch 12 are forced against each other, and determines the amount of engagement or slip of the clutch 12. The automatic transmission 14 has a plurality of planetary gear sets, clutches and brakes, so as to selectively establish a plurality of drive positions. A transmission controller 28 controls the clutches and brakes, so that a speed ωi of the input shaft 30 connected to the clutch 12 is changed at a selected one of a plurality of speed ratios, into a speed ωo of the output shaft 32. The speeds ωi, ωo of the input shaft 30 and the output shaft 32 are detected by respective speed sensors 34, 36.

The clutch controller 26 includes a microcomputer incorporating a CPU (central processing unit), a RAM (random-access memory), a ROM (read-only memo) and a clock signal generator. The CPU operates to effect data processing operations for controlling the clutch actuator 24 to adjust the clutch pressure $P_{CL}$ of the hydraulic cylinder, according to control programs stored in the ROM, while utilizing a temporary data storage function of the RAM. Described more specifically, the clutch controller 26 is adapted to receive signals indicative of the throttle valve opening angle ψ, engine speed ωE and input shaft speed ωi, as well as necessary information received from the transmission controller 28 and other controllers or sensors, for adjusting the clutch pressure $P_{CL}$. For instance, the clutch controller 26 lowers the clutch pressure $P_{CL}$ on the basis of the received signals and information so as to place the clutch 12 in the fully released state when the vehicle is at a stop or the automatic transmission 14 is in the process of a shifting action. At the time of or during starting of the vehicle, the clutch controller 26 adjusts the clutch pressure $P_{CL}$ to a suitable value, so that the clutch 12 is placed in a suitably slipping or partially engaged state to control the clutch torque $T_{CL}$ corresponding to the adjusted clutch pressure $P_{CL}$.

Figure 2:
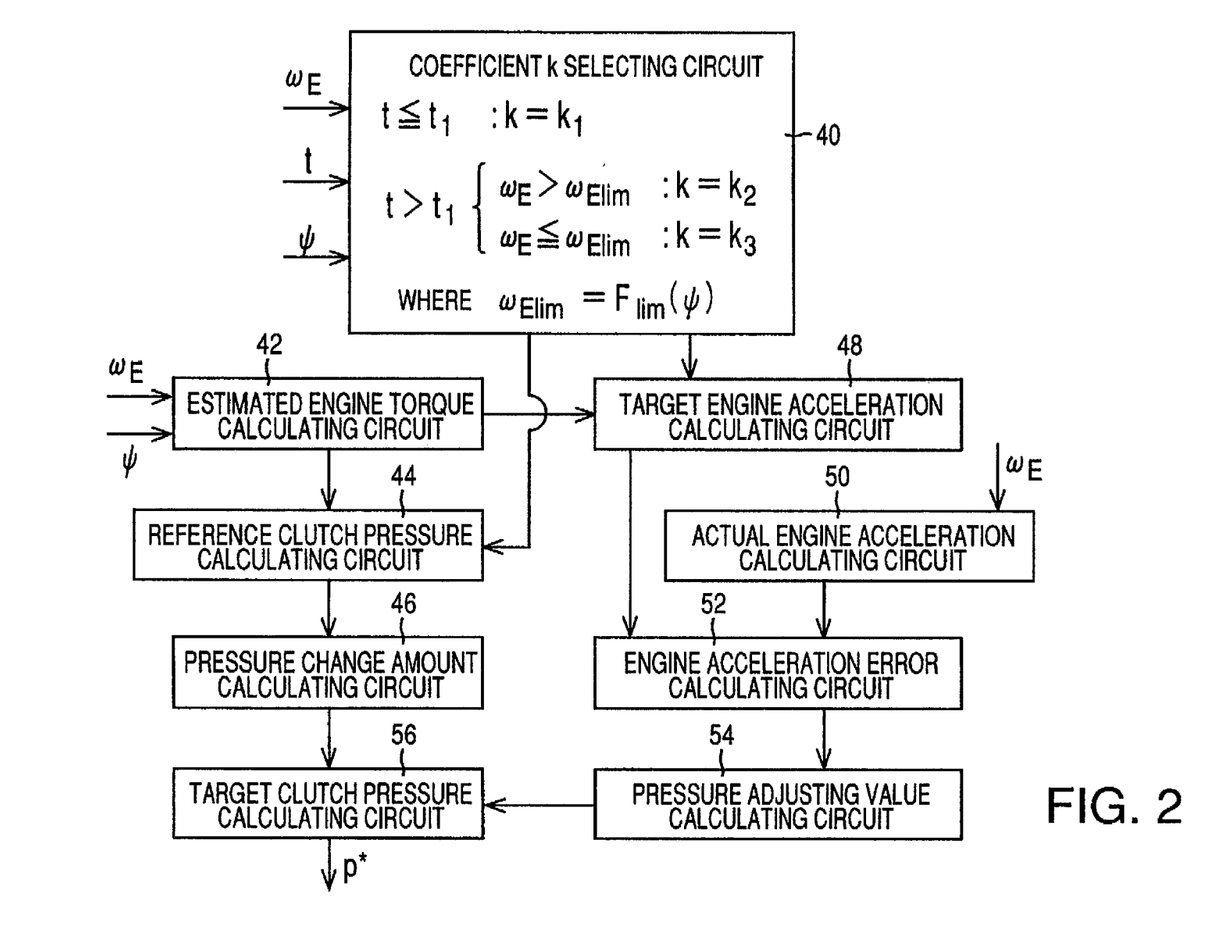
FIG. 2 is a block diagram illustrating various circuits of a clutch controller of FIG. 2 for performing various functions to control a clutch provided on the vehicle.

Referring to FIG. 2, there is shown a block diagram for explaining various functions of the clutch controller 26 for controlling the amount of slip or partial engagement of the clutch 12 during starting of the vehicle. As shown in FIG. 2, the clutch controller 26 includes: a coefficient selecting circuit 40; an estimated engine torque calculating circuit 42; reference clutch pressure calculating circuit 44; a pressure change amount calculating circuit 46; a target engine acceleration calculating circuit 48; an actual engine acceleration calculating circuit 50; an acceleration error calculating circuit 52; a pressure adjusting value calculating circuit 54; and a target clutch pressure calculating circuit 56.

The coefficient selecting circuit 40 is adapted to select a clutch engagement pressure coefficient k, on the basis of the engine speed ωE, the throttle opening ψ and a time t which has elapsed after the slip control operation of the clutch 12 is initiated upon starting of the vehicle. The coefficient selecting circuit 40 selects a coefficient k1 before the time t reaches a predetermined value t1. The coefficient k represents a ratio $T_{CL}/T_E$, i.e., a ratio of the clutch torque $T_{CL}$ with respect to the engine torque $T_E$. When the coefficient k is equal to 1 (k=1), this means that the engine speed ωE is kept substantially constant. The engine speed ωE decreases when the coefficient k is larger than 1 (k>1), while the engine speed ωE increases when the coefficient k is smaller than 1 (k<1). In other words, an acceleration ΩE of the engine 10 is represented by the following equation (1), and changes depending upon a torque difference ($T_E$-$T_{CL}$) between the engine torque $T_E$ and the clutch torque $T_{CL}$. In the equation (1), $I_E$ represents a moment of inertia of the engine 10.

$$\Omega E = (T_E - T_{CL})/I_E = (T_E - k \times T_E)/I_E \qquad (1)$$
$$= (1-k) \times T_E/I_E$$

Before and when the time t reaches the predetermined value t1, namely, when t≦t1, the coefficient selecting circuit 40 selects the coefficient k1 which is smaller than "1". In this case, the engine acceleration ΩE obtained from the above equation (1) is a positive value. The predetermined time t1 is a constant value suitably determined in view of the operating characteristics of the engine 10 and the clutch 12, so as to avoid deterioration in durability of the clutch 12 due to heat which would be generated by a prolonged slip control under the coefficient k2, deterioration in the starting performance of the vehicle and an overrun of the engine 10 or excessive rise of the engine speed When the predetermined time t1 has passed, the coefficient selecting circuit 40 selects a coefficient k2 or k3 depending on whether the engine speed ωE is higher than a lower limit ωElim or not. The lower limit ωElim is determined to be as low as possible, so as to prevent engine troubles such as unstable engine operation or stall, taking account of a detecting error of the engine speed sensor 22 and operating characteristics of the particular engine 10. The lower limit ωElim may be determined according to a suitable equation which includes the throttle valve opening angle ψ as a parameter, or a data map which represents an equation ωElim=Flim (ψ), for instance. The coefficient k2 is selected when the engine speed ωE is higher than the lower limit ωElim (when ωE>ωElim) is larger than "1". In this case, the engine acceleration ΩE obtained from the above equation (1) is a negative value. On the other hand, the coefficient k3 selected when the engine speed ωE is not higher than the lower limit ωElim (when ωE≦ωElim) is equal to "1", and the engine acceleration ΩE obtained from the equation (1) is zero.

Referring back to FIG. 2, the estimated engine torque calculating circuit 42 of the clutch controller 26 adapted to calculate an estimated torque [$T_E$] of the engine 10 based on the engine speed ωE and the throttle valve opening angle ψ. The estimated engine torque [$T_E$] may be obtained according to a suitable data map or equation which includes the engine speed ωE and the throttle valve opening angle ψ as parameters. The reference clutch pressure calculating circuit 44 is adapted to calculate a reference value $p_0$ of the clutch pressure p (hereinafter referred to as "reference clutch pressure $p_0$") according to the following formula (2), on the basis of the estimated engine torque [$T_E$] obtained by the circuit 42 and the clutch engagement pressure coefficient k.

$$p_0 = k \times [T_E]/Cc \qquad (2)$$

In the above formula (2), Cc represents a clutch torque coefficient which satisfies a relationship $T_{CL}$=Cc×$P_{CL}$. In other words, when the clutch pressure $P_{CL}$ of the clutch actuator 24 is adjusted to the reference clutch pressure $p_0$, the clutch torque $T_{CL}$ is equal to k×[$T_E$] if the clutch torque coefficient Cc does not include an error. Hereinafter, the value represented by k×[$T_E$] is referred to as a target clutch torque [$T_{CL}$]. The pressure change amount calculating circuit 46 is adapted to calculate a change amount $\Delta p_0$ of the reference clutch pressure $p_0$ according to the following formula (3).

$$\Delta p_0 = p_0 - p_{00} \quad (3)$$

The adjustment of the clutch pressure $P_{CL}$ for partially engaging the clutch 12 is repeatedly executed at a predetermined cycle time. The circuit 46 stores, as a pressure value $p_{00}$, a value of the reference clutch pressure $p_0$ which was obtained in the last cycle, and obtains the pressure change amount $\Delta p_0$ by subtracting the stored pressure value $p_{00}$ from a value of the reference clutch pressure $p_0$ which is obtained in the present cycle time.

The target engine acceleration calculating circuit 48 is adapted to calculate a desired or target acceleration [$\Omega E$] of the engine 10 according to the following equation (4), on the basis of the clutch engagement pressure coefficient k and the estimated engine torque [$T_E$] obtained by the circuit 44.

$$[\Omega E] = (1-k) \times [T_E]/I_E \quad (4)$$

In the above equation (4), the value $(1-k) \times [T_E]$ corresponds to a torque difference between the estimated engine torque [$T_E$] and the target clutch torque [$T_{CL}$]=k×[$T_E$]. Thus, the target engine acceleration [$\Omega E$] may be obtained from the equation (4) in accordance with the torque difference. The actual engine acceleration calculating circuit 50 is adapted to calculate an actual acceleration $\Omega E$ of the engine 10 by differentiating the engine speed $\omega E$, while the acceleration error calculating circuit 52 is adapted to calculate an acceleration error $\Delta \Omega E$ by subtracting the target engine acceleration [$\Omega E$] from the actual engine acceleration $\Omega E$. The pressure adjusting value calculating circuit 54 is adapted to calculate a pressure adjusting value $\Delta p$ for adjusting the reference clutch pressure $p_0$ so as to zero the acceleration error $\Delta \Omega E$. The pressure adjusting value $\Delta p$ may be obtained according to a suitable feedback control equation which includes the acceleration error $\Delta \Omega E$ as a parameter, for instance. More specifically described, when the actual engine acceleration $\Omega E$ is larger than the target engine acceleration [$\Omega E$], and the acceleration error $\Delta \Omega E$ is a positive value, the pressure adjusting value $\Delta p$ is determined to be a positive value so that the actual engine acceleration $\Omega E$ decreases, in other words, the clutch torque $T_{CL}$ increases. On the other hand, when the actual engine acceleration $\Omega E$ is smaller than the target engine acceleration [$\Omega E$], and the acceleration error $\Delta \Omega E$ is a negative value, the pressure adjusting value $\Delta p$ is determined to be a negative value so that the actual engine acceleration $\Omega E$ increases, in other words, the clutch torque $T_{CL}$ decreases.

The target clutch pressure calculating circuit 56 is adapted to update a desired or target value p* of the clutch pressure $p_0$ by adding the pressure change amount $\Delta p_0$ and the pressure adjusting value $\Delta p$ obtained as described above, according to the following equation (5).

$$p^* = p^* + \Delta p_0 + \Delta p \quad (5)$$

The clutch controller 26 applies a drive signal representative of the updated target clutch pressure p* to the electromagnetic pressure control valve, so that the clutch pressure $P_{CL}$ of the clutch actuator 24 coincides with the target clutch pressure p*. Accordingly, the amount of engagement of the clutch 12 is controlled so as to transmit the target clutch torque [$T_{CL}$]=k×[$T_E$].

Figure 3:
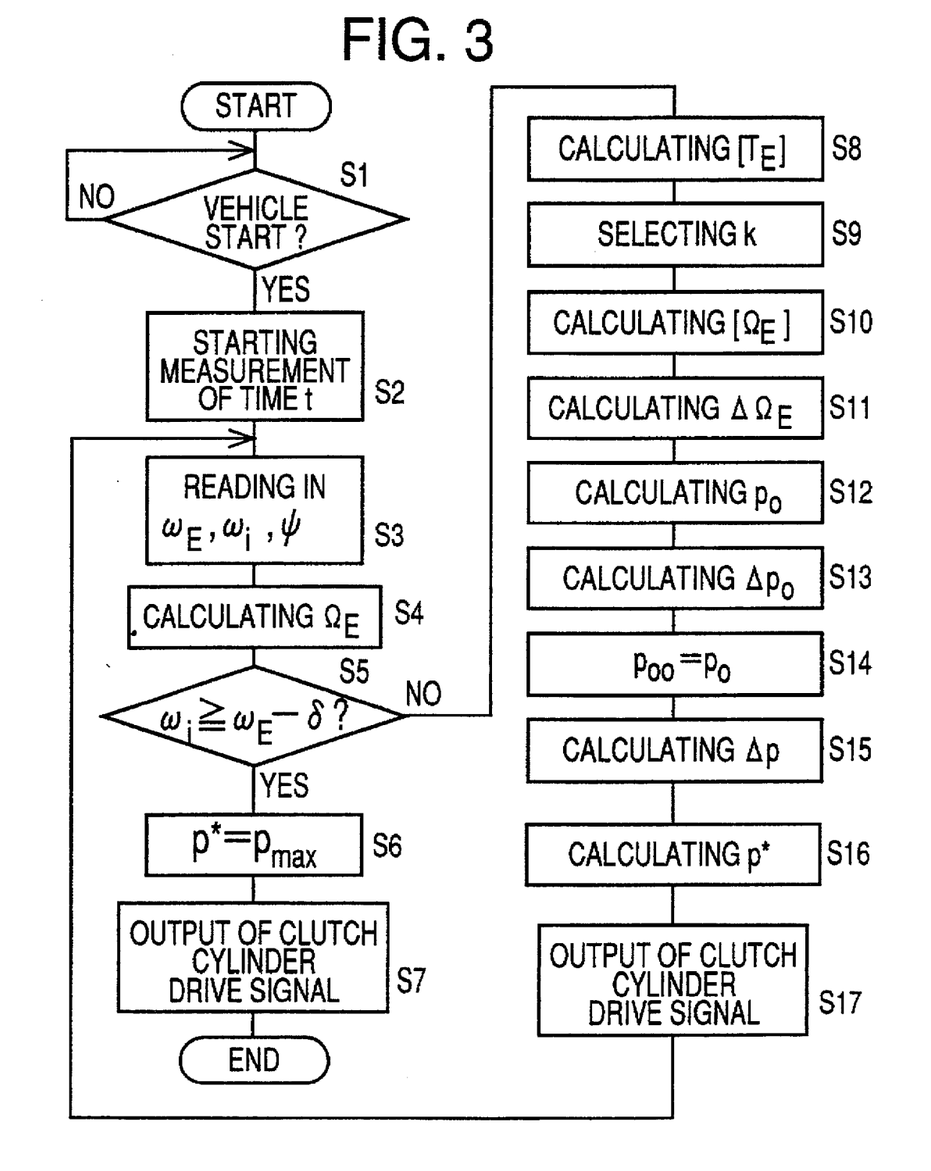
FIG. 3 is a flow chart illustrating a control routine for controlling the clutch during starting of the vehicle in the embodiment of FIG. 1.
Figure 4:
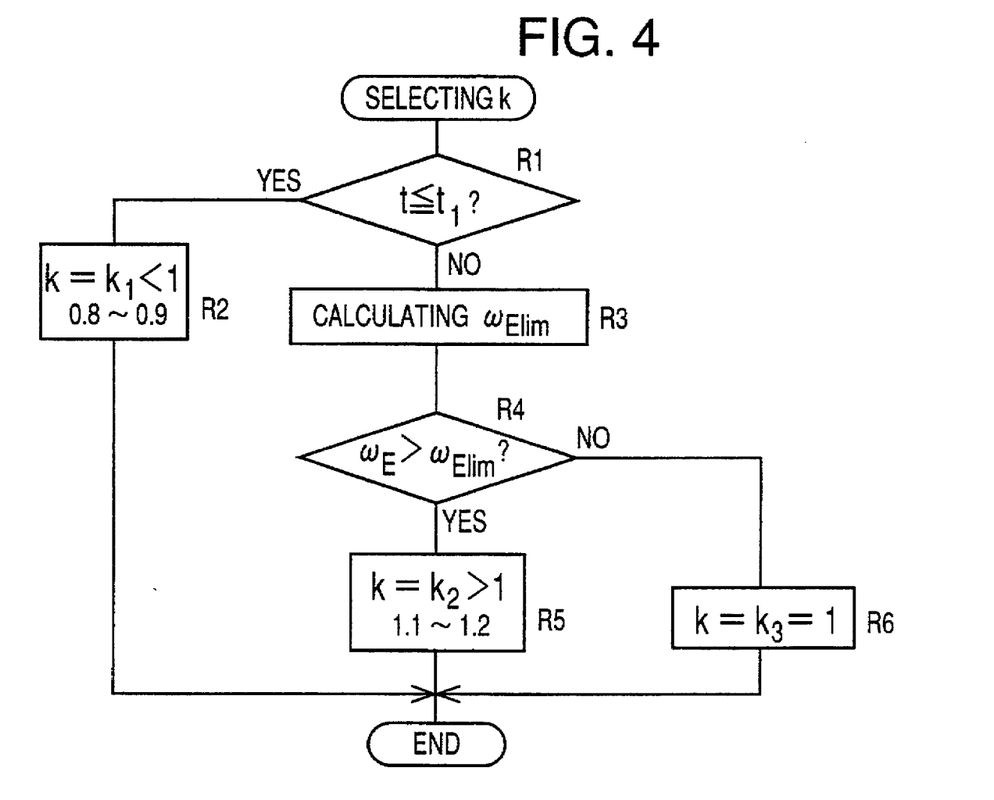
FIG. 4 is a flow chart illustrating an operation executed in step S9 of the routine of FIG. 3 for selecting a coefficient k.

Reference is now made to the flow charts of FIGS. 3 and 4, which show an operation of the clutch controller 26 for controlling the clutch 12 during starting of the vehicle.

Referring first to the flow chart of FIG. 3, the control routine is initiated with step S1 to determine whether the vehicle is being started or not, on the basis of various input signals received by the clutch controller 26. For instance, the determination in step S1 is effected by judging whether the idling position switch of the throttle sensor 20 is turned from "ON" to "OFF" while the clutch 12 is in the fully released state with the automatic transmission 14 placed in a low-speed drive position or in a reverse drive position, and while the vehicle speed is lower than a predetermined value. If an affirmative decision (YES) is obtained in step S1, the control flow goes to step S2 to start measuring the time t. Step S2 is followed by step S3 to read in the engine speed $\omega E$, the input shaft speed $\omega i$ and the throttle valve opening angle $\psi$. The control flow then goes to step S4 in which the calculating circuit 50 calculates the actual engine acceleration $\Omega E$. It is noted that a portion of the clutch controller 26 assigned to execute step S4 cooperates with the engine speed sensor 22 to constitute means for obtaining the actual engine acceleration $\Omega E$.

Step S4 is followed by step S5 to determine whether speed $\omega i$ of the input shaft 30, i.e., the speed of the driven rotating member of the clutch 12 is higher than a predetermined value ($\omega E - \delta$). This value ($\omega E - \delta$) is obtained by subtracting a certain value $\delta$ from the engine speed $\omega E$. The value $\delta$ is determined taking account of the detecting errors of the engine speed sensor 22 and the input shaft speed sensor 34. This step S5 is effected to determine whether the input shaft speed $\omega i$ has been raised to a level substantially equal to the engine speed $\omega E$, to determine whether the driving and driven rotating members of the clutch 12 are rotated at substantially the same speed. If the input shaft speed $\omega i$ is not lower than the above-indicated predetermined value ($\omega E - \delta$), the control flow goes to step S6 to set a maximum pressure $p_{max}$ as the target clutch pressure p*. Step S6 is followed by step S7 to apply, to the clutch actuator 24, a drive signal for adjusting the clutch pressure $P_{CL}$ to the target clutch pressure p*, i.e., the maximum clutch pressure $p_{max}$, so that the clutch 12 is placed in the fully engaged state under the maximum clutch pressure $p_{max}$. If a negative decision (NO) is obtained in step S5, that is, if the input shaft speed $\omega i$ is smaller than the predetermined value ($\omega E - \delta$), the control flow goes to step S8 and the following steps for controlling the amount of slip or Partial engagement of the clutch 12. During an initial period of a clutch control operation effected by the clutch controller 26 during starting of the vehicle, the input shaft speed $\omega i$ is substantially zero, and is accordingly lower than the value ($\omega E - \delta$). In this case, the clutch 12 is controlled in the slip control mode by effecting the step S8 and the following steps as described below. The above-indicated time t which is measured by starting a timer in step S2 substantially corresponds to a time duration during which the slip control operation of the clutch 12 has been effected. It is noted that a portion of the clutch controller 26 assigned to execute step S5 constitutes clutch speed monitoring means for determining whether the speed of the driven rotating member of the clutch 12 is substantially equal to the engine speed $\omega E$, while a portion of the clutch controller 26 assigned to execute steps S6 and S7 cooperate with the clutch actuator 24 to constitute means for fully engaging the clutch 12.

Step S8 is effected to calculate the estimated engine torque [$T_E$] by means of the calculating circuit 42. It is noted that engine torque determining means for determining the estimated engine torque [$T_E$] is constituted by a portion of the clutch controller 26 assigned to execute step S8, the throttle sensor 20 for detecting the throttle valve opening angle $\psi$ and the engine speed sensor 22 for detecting the engine speed $\omega E$. Step S8 is followed by step S9 in which the coefficient selecting circuit 40 selects the clutch engagement pressure coefficient k. Referring to the flow chart of FIG. 4, there is shown a sub-routine for selecting the coefficient k. The sub-routine of FIG. 4 is initiated with step R1 to determine whether the time t which is measured by starting the appropriate timer in step S2 has exceeded the predetermined value t1. If the time t has not exceeded the predetermined value t1, step R1 is followed by step R2 to select, as the clutch engagement pressure coefficient k, the coefficient k1 which is smaller than "1". On the other hand, if the time t has exceeded the predetermined value t1, the control flow goes to step R3 to calculate the lower limit $\omega$Elim of the engine speed $\omega E$. Step R3 is followed by step R4 to determine whether the engine speed $\omega E$ is higher than the lower limit $\omega$Elim determined in step R3. If an affirmative decision (YES) is obtained in step R4 (i.e., if $\omega E > \omega$Elim), the control flow then goes to step R5 to select the coefficient k2 which is larger than "1". If a negative decision (NO) is obtained in step R5 (i.e., if $\omega E \leq \omega$Elim), step R6 is implemented to select the coefficient k3 which is equal to "1". It is noted that a portion of the clutch controller 26 assigned to implement step R1 constitutes time lapse determining means for determining whether the predetermined time t1 has passed after the slip control operation of the clutch 12 is initiated by first slip control means, while a portion of the clutch controller 26 assigned to implement step R4 constitutes engine speed monitoring means for determining whether the engine speed $\omega E$ is higher or lower than the lower limit $\omega$Elim.

Referring back to the flow chart of FIG. 3, step S9 is followed by step S10 in which the target engine acceleration [$\Omega E$] is calculated by the calculating circuit 48. This step S10 corresponds to means for calculating the target engine acceleration [$\Omega E$]. The control flow then goes to step S11 in which the calculating circuit 52 calculates the engine acceleration error $\Delta \Omega E$. Step S11 is followed by step S12 in which the reference clutch pressure $p_0$ is calculated by the calculating circuit 44. Subsequently, the control flow goes to step S13 in which the calculating circuit 46 calculates the change amount $\Delta p_0$ of the reference clutch pressure $p_0$, and then goes to step S14 to store the reference clutch pressure $p_0$ obtained in the present cycle as the clutch pressure $p_{00}$. Step S14 is followed by step S15 in which the calculating circuit 54 calculates the pressure adjusting value $\Delta p$. Then, the control flow goes to step S16 in which the calculating circuit 56 calculates the target clutch pressure $p^*$. Step S16 is followed by step S17 to apply, to the clutch actuator 24, the drive signal for adjusting the clutch pressure $P_{CL}$ to the target clutch pressure $p^*$ obtained in step S16. Thus, the amount of slip or engagement of the clutch 12 is controlled so as to transmit the target clutch torque [$T_{CL}$]=k×[$T_E$].

In the present embodiment, it is noted that a portion of the clutch controller 26 assigned to implement steps S9, S12, S13, S14, S16 and S17 constitutes slip control means for controlling the amount of slip of the clutch 12. Described more specifically, when the coefficient k1 is selected in step S9, the above portion of the clutch controller 26 serves as the above-indicated first slip control means. When the coefficient k2 is selected in step S9, the above portion of the clutch controller 26 serves as second slip control means while it serves as third slip control means when the coefficient k3 is selected in step S9. It is further noted that a portion of the clutch controller 26 assigned to implement steps S11, S15 and S16 constitutes adjusting means for adjusting a clutch drive force, namely, a force by which the friction members of the clutch 12 are pressed against each other.

Figure 5:
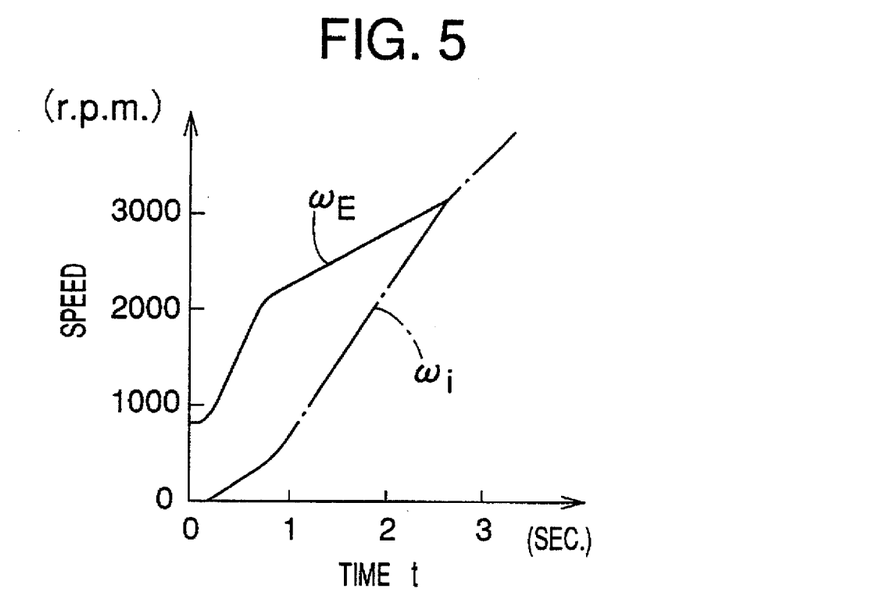
FIG. 5 is a time chart showing changes in engine speed $\omega E$ and input shaft speed $\omega i$ in a normal running condition of the vehicle when the clutch is controlled according to the routine of FIG. 3.

In an initial period of the slip control operation of the clutch 12, namely, before the time t which has passed after the slip control operation is initiated has reached the predetermined value t1, the clutch engagement pressure coefficient k is set at k1 (<1) in step R2 of the sub-routine of FIG. 4. In this state, the clutch 12 is placed in the partially engaged state under the target clutch torque [$T_{CL}$]=k1×[$T_E$] which is smaller than the estimated engine torque [$T_E$]. Accordingly, the engine torque $T_E$ is larger than the clutch torque $T_{CL}$ and therefore, the engine speed $\omega E$ increases in accordance with the engine acceleration $\Omega E$ (positive value) while the clutch 12 is in the partially engaged state. Further, a portion of the engine torque $T_E$ which corresponds to the clutch torque $T_{CL}$ is transmitted to the input shaft 30 of the automatic transmission 14 via the clutch 12, and the rotating speed $\omega i$ of the input shaft 30 is increased in accordance with the clutch torque $T_{CL}$ transmitted through the clutch 12. The clutch engagement pressure coefficient k1 is selected within a range between 0.8 and 0.9, for example, depending upon the characteristics of the engine 10 and the vehicle, so that the engine speed $\omega E$ is increased, while at the same time, the input shaft speed $\omega i$ is rapidly increased up to the engine speed $\omega E$, during a normal running of the vehicle, e.g., during running on a flat road surface. A time chart of FIG. 5 shows that the engine speed $\omega E$ and the input shaft speed $\omega i$ are both increased during running on a flat road surface according to the present embodiment.

In the present embodiment, the engine torque $T_E$ is distributed such that the engine speed $\omega E$ and the input shaft speed $\omega i$ are both increased during starting of the vehicle. This arrangement is effective to eliminate conventionally experienced poor drivability and driving discomfort during starting of the vehicle, to thereby assure improved starting performance of the vehicle. In the present arrangement, in particular, the clutch torque $T_{CL}$ is controlled on the basis of the engine torque $T_E$, and the engine speed $\omega E$ and the input shaft speed $\omega i$ can be increased with a better balance, than in a case wherein the slip control operation of the clutch 12 is effected so as to optimize the engine acceleration $\Omega E$.

Figure 8:
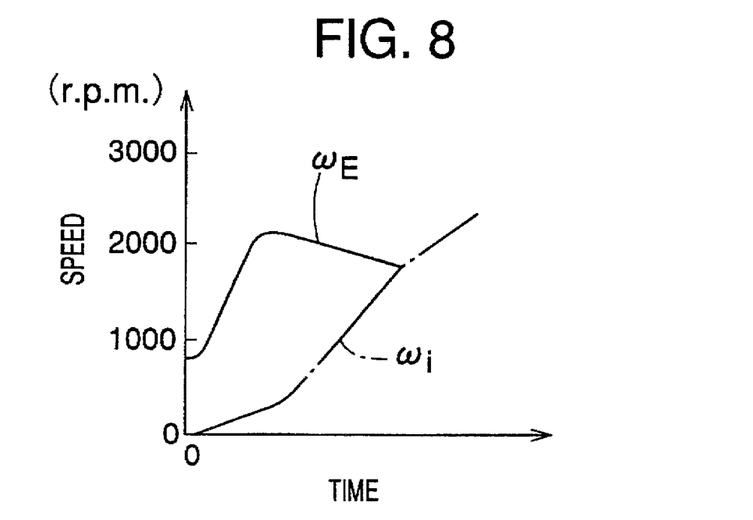
FIG. 8 is a time chart showing changes in the engine speed $\omega E$ and the input shaft speed $\omega i$ when the clutch is controlled such that the clutch torque is larger than the engine torque during starting of the vehicle.

On the contrary, when the clutch torque $T_{CL}$ is controlled such that the clutch torque $T_{CL}$ increases as an exponential function of the engine speed $\omega E$, for instance, the clutch torque $T_{CL}$ is larger than the engine torque $T_E$. In this case, as shown in the time chart of FIG. 8, the engine speed $\omega E$ is temporarily lowered, and then raised after the clutch is placed in the fully engaged state. This arrangement undesirably causes deteriorated vehicle drivability and driving comfort, leading to poor acceleration performance of the vehicle.

If the amount of slip of the clutch 12 is controlled such that the clutch torque $T_{CL}$ is smaller than the engine torque $T_E$ as described above while the vehicle is running under a relatively large running resistance or load, e.g., while the vehicle is running on an uphill road surface, a rate of increase in the input shaft speed $\omega i$ is reduced. In this case, the clutch 12 is kept in the partially engaged state in a considerably long time, undesirably causing friction heat which deteriorates durability of the clutch 12. Moreover, the engine speed $\omega E$ tends to rise without a rise of the input shaft speed $\omega i$, leading to a considerable reduction in a rate of increase in the vehicle speed and considerable deterioration of the starting drivability of the vehicle. Further, the engine 10 may suffer from an overrun due to the increased engine speed $\omega E$.

Figure 6:
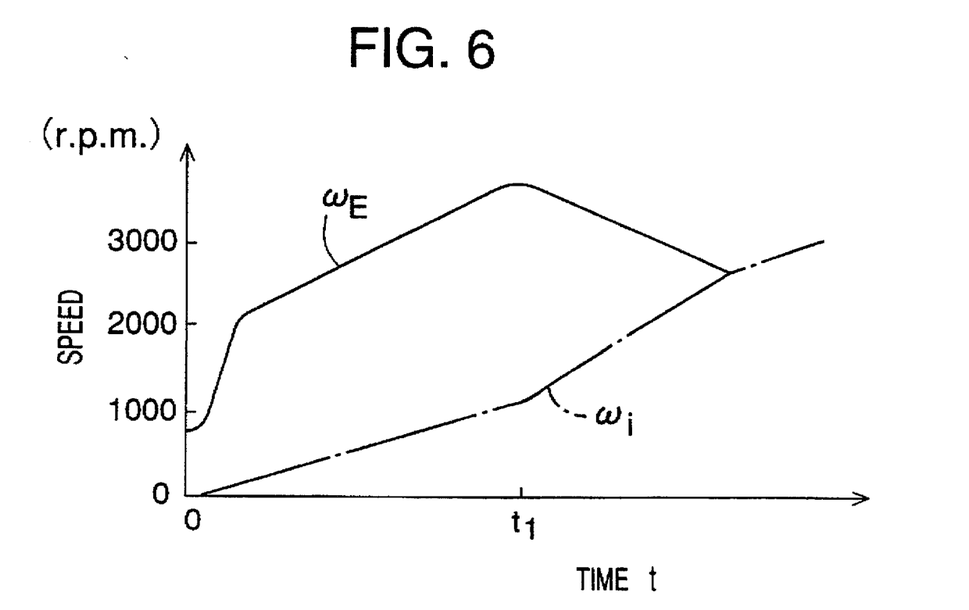
FIG. 6 is a time chart showing changes in the engine speed $\omega E$ and the input shaft speed $\omega i$ during running under a relatively large running load when the clutch is controlled according to the routine of FIG. 3.

In the present embodiment, however, when the time t which has passed after the slip control operation of the clutch 12 is initiated reaches the predetermined value t1, the clutch engagement pressure coefficient k is set at k2 (>1) in step R5 of the sub-routine of FIG. 4. Accordingly, the clutch 12 is controlled with the target torque $[T_{CL}]=k2\times[T_E]$ set to be larger than the estimated engine torque $[T_E]$. In this state, the clutch torque $T_{CL}$ is controlled to be larger than the engine torque $T_E$, and the torque transmitted to the input shaft 30 via the clutch 12 is accordingly increased. Thus, the input shaft speed ωi is rapidly increased while the engine speed ωE is lowered. In this respect, since the engine speed ωE has been raised to a certain extent during the slip control operation of the clutch 12 with the clutch engagement pressure coefficient k set at k1, the engine troubles such as engine stalling do not occur immediately after the engine speed ωE is lowered. The coefficient k2 is selected within a range between 1.1 and 1.2, for example, in view of the characteristics of the engine 10 and the vehicle, so that the input shaft speed ωi is rapidly increased even when the vehicle is running under a relatively large running resistance or load (e.g., running on the uphill road), and that the input shaft speed ωi is quickly raised to the engine speed ωE which is gradually lowered. The time chart of FIG. 6 shows changes in the engine speed ωE and the input shaft speed ωi, that is, shows that the speed ωE and the speed ωi coincide with each other in a short time after the coefficient k is changed from k1 to k2 upon expiration of the time t1.

In the present arrangement, when the predetermined time t1 has passed with the clutch 12 kept in the partially engaged state under the coefficient k1, the coefficient k1 is changed to k2 which is larger than "1". As a result, the clutch torque $T_{CL}$ is made larger than the engine torque $T_E$, and the input shaft speed ωi is rapidly increased while the engine speed ωE is lowered, so as to place the clutch 12 in the fully engaged state as quickly as possible. According to this arrangement, the poor drivability conventionally experienced during starting of the vehicle on the uphill road is reduced, leading to improved starting performance of the vehicle. Further, the clutch 12 does not suffer from deteriorated durability which would result from frictional heat caused while the clutch 12 is in the partially engaged state, since the clutch 12 is adapted to be placed in the fully engaged state as quickly as possible when the predetermined time t1 has passed. In addition, the engine 10 is free from the overrun because the engine speed ωE is lowered.

Figure 7:
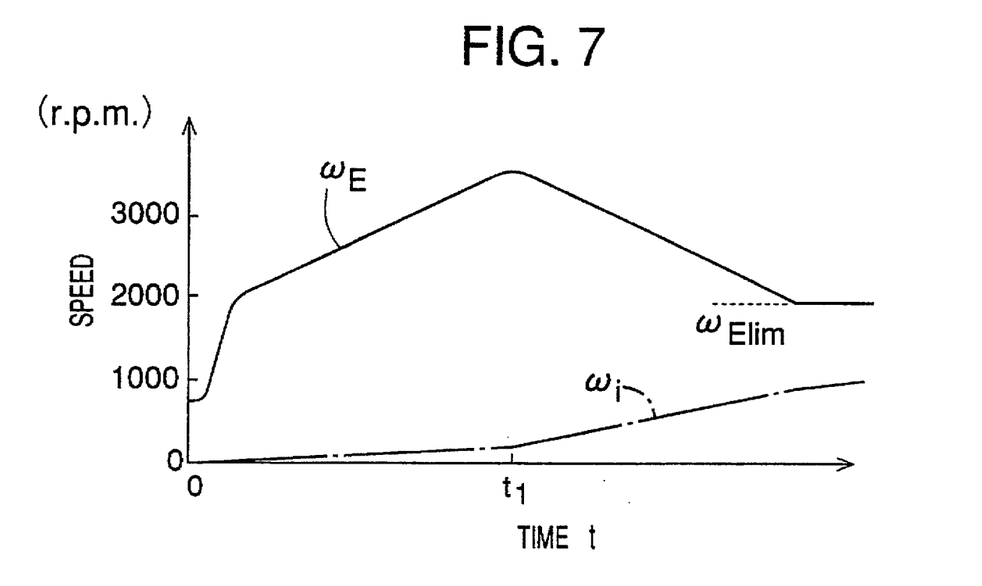
FIG. 7 is a time chart showing changes in the engine speed $\omega E$ and the input shaft speed $\omega i$ during running under a larger running load when the clutch is controlled according to the routine of FIG. 3.

According to the present embodiment, when the engine speed ωE is lowered below the lower limit ωElim with the clutch 12 kept in the partially engaged state with the coefficient k2, the coefficient k2 is replaced by the coefficient k3 (=1) in step R6 of the sub-routine of FIG. 4. As a result, the amount of slip of the clutch 12 is controlled with the target torque $[T_{CL}]=k3\times[T_E]=[T_E]$ set to be equal to the estimated engine torque $[T_E]$. Since the engine torque $T_E$ is made substantially equal to the clutch torque $T_{CL}$, the engine acceleration ΩE is made substantially zero, in other words, the engine speed ωE is maintained at a substantially constant level. Thus, the present embodiment prevents a further decrease in the engine speed ωE. Described in detail, when the vehicle is running under a considerably large running resistance or load (e.g., running on a steep uphill road surface), the vehicle is prevented from suffering from unstable engine operation or engine stall which would result from a low rate of increase in the input shaft speed ωi and continuous reduction in the engine speed ωE while the clutch 12 is controlled in the slip control mode with the coefficient k set at k2. The time chart of FIG. 7 shows changes in the engine speed ωE and the input shaft speed ωi with the coefficient k changed from k1 to k2, then to k3.

According to the present embodiment, the clutch controller 26 is adapted to obtain the pressure adjusting value Δp for adjusting the reference clutch pressure $p_0$, so as to zero the engine acceleration difference ΔΩE between the actual engine acceleration ΩE and the target engine acceleration [ΩE]. The obtained pressure adjusting value Δp is added to the present value of the reference clutch pressure $p_0$, so that the target clutch pressure p* is updated. Even when the clutch torque coefficient Cc includes some error, the clutch torque $T_{CL}$ is controlled such that the target engine acceleration [ΩE] is obtained on the basis of the estimated engine torque $[T_E]$ and the clutch engagement coefficient k according to the equation (4) as indicated above. In other words, the clutch torque $T_{CL}$ is controlled such that the torque difference $(T_E-T_{CL})$ between the actual engine torque $T_E$ and the actual clutch torque $T_{CL}$ is equal to the value $(1-k)\times[T_E]$. Described more specifically, in the event that the clutch torque coefficient Cc contains some error, the reference clutch pressure $p_0$ obtained from the equation (2) inevitably includes some error. Accordingly, the target clutch torque represented as $[T_{CL}]=k\times[T_E]$ deviates from the actual clutch torque $T_{CL}$. In the present embodiment, however, the clutch torque $T_{CL}$ is controlled such that the torque difference $(T_E-T_{CL})$ is made equal to the value $(1-k)\times[T_E]$. If the estimated engine torque $[T_E]$ is equal to the actual engine torque $T_E$, the actual clutch torque $T_{CL}$ is represented as $k\times[T_E]=k\times T_E$. Accordingly, the amount of slip or engagement of the clutch 12 is controlled so as to achieve the target clutch torque $[T_{CL}]=k\times[T_E]$.

The estimated engine torque $[T_E]$ also contains some error since it is difficult to obtain the estimated engine torque $[T_E]$ which coincides with the actual engine torque $T_E$ with high accuracy. If the estimated engine torque $[T_E]$ contains an error $\Delta T_E$, the estimated engine torque $[T_E]$ is represented as $[T_E]=T_E+\Delta T_E$. In this case, the target clutch torque $[T_{CL}]$, namely, the actual clutch torque which is determined by the target clutch torque $[T_{CL}]$ is represented as $k\times[T_E]=k\times(T_E+\Delta T_E)$. This means that the target or desired clutch torque $k\times T_E$ contains an error $k\times\Delta T_E$. In this respect, since the coefficient k is substantially equal to 1, the error $\Delta T_E$ of the estimated engine torque $[T_E]$ is included in the clutch torque $T_{CL}$. This error $\Delta T_E$ of the clutch torque $T_{CL}$ makes it difficult to obtain the actual engine acceleration ΩE and the input shaft acceleration ωi as desired. However, in the present embodiment wherein the clutch torque $T_{CL}$ is controlled such that the actual engine acceleration ΩE coincides with the target engine acceleration [ΩE], the torque difference $(T_E-T_{CL})$ between the engine torque $T_E$ and the clutch torque $T_{CL}$ when the estimated engine torque $[T_E]$ contains the error $\Delta T_E$ is represented as follows:

$$(T_E-T_{CL}) = (1-k)\times[T_E]$$
$$= (1-k)\times T_E+(1-k)\times\Delta T_E$$

In this case, the actual clutch torque is represented as follows:

$$T_{CL}=k\times T_E-(1-k)\times\Delta T_E$$

Accordingly, the error from the target clutch torque $k\times T_E$ is $(1-k)\times\Delta T_E$. However, since the coefficient k is substantially equal to 1, the obtained actual clutch torque is not influenced by the error $\Delta T_E$ of the estimated engine torque $[T_E]$.

According to the present embodiment wherein the clutch torque $T_{CL}$ is controlled such that the actual engine acceleration ΩE is made equal to the target engine acceleration [ΩE], the clutch torque $T_{CL}$ is accurately controlled irrespective of an error in determining the clutch torque coefficient Cc, a chronological change of the clutch 12 and an error in calculating the estimated engine torque $[T_E]$. Thus, the clutch 12 is controlled so as to appropriately control the clutch torque $T_{CL}$ depending on the clutch engagement pressure coefficient k. In the present embodiment, the engine torque $T_E$ is suitably controlled as desired so that the engine speed ωE and the input shaft speed ωi are changed as desired depending on the engine torque $T_E$ and the vehicle running resistance or load.

While the present invention has been described in detail with its presently preferred embodiment for the illustrative purpose only, it is to be understood that the invention is not limited to the details of the illustrated embodiment, but may be otherwise embodied.

In the illustrated embodiment, the change amount $\Delta p_0$ of the reference clutch pressure $p_0$ is calculated by the calculating circuit 46 in step S13 of the control routine of FIG. 3. Thereafter, the target clutch pressure p* is obtained by adding the calculated change amount $\Delta p_0$ to the current value of the target clutch pressure p*. However, the target clutch pressure p* for partial engagement of the clutch 12 to provide a suitable clutch torque may be otherwise obtained. For instance, the reference clutch pressure $p_0$ may be used as the target clutch pressure p*. The clutch pressure $P_{CL}$ may be feedback controlled such that the actual engine acceleration ΩE approaches the target engine acceleration [ΩE]. In this case, it is not required to obtain the reference clutch pressure $p_0$ since the actual engine acceleration ΩE substantially corresponds to the torque difference of the engine torque $T_E$ and the clutch torque $T_{CL}$.

The clutch 12 in the illustrated embodiment is a friction clutch in which two friction members are brought into engagement by the pressure of the hydraulic cylinder. However, the principle of the present invention is equally applicable to various types of clutch, such as an electromagnetic clutch in which the clutch torque can be continuously changed. Further, the clutch actuator 24 may employ an electric motor or other means for adjusting the drive force for engaging the clutch 12, depending on the specific kinds of the clutch 12.

In the illustrated embodiment, the target pressure p* is set at the maximum pressure $p_{max}$ in step S6 of the control routine of FIG. 3, so that the clutch 12 is placed in the fully engaged state by setting the target pressure p* at the maximum value $p_{max}$ in step S7. However, the clutch pressure $P_{CL}$ may be controlled such that the clutch torque is larger than the estimated engine torque $[T_E]$. For instance, the clutch pressure $P_{CL}$ may be adjusted so as to provide a clutch torque of $1.2 \times [T_E]$.

In the illustrated embodiment, the lower limit ωElim of the engine speed ωE and the estimated engine torque $[T_E]$ are obtained on the basis of the throttle valve opening angle ψ. However, the lower limit ωElim and the estimated engine torque $[T_E]$ may be obtained on the basis of an intake air quantity obtained by suitable detecting means such as an air flow meter. The engine torque varies with a change in a friction torque of the engine 10 which is influenced by specific operating states of an exhaust gas recirculation system (EGR) and the temperature of the coolant for the engine. Furthermore, variations in a torque for driving an oil pump or in a torque for driving auxiliary components such as an air conditioner or an alternator also influence the engine torque which contributes to a rise in the engine speed or in the speed of the driven rotating member of the clutch.

The estimated engine torque $[T_E]$ may be obtained in view of the operating conditions of those components.

The clutch 12 is placed in the partially engaged state by common slip control means by changing the clutch engagement pressure coefficient k so as to select appropriate one of the first, second and third slip control means. The first through third slip control means may be constructed independently of each other.

Although the rotating speed ωi of the input shaft 30 is detected by the speed sensor 34 in the illustrated embodiment, the input shaft speed ωi may be obtained from the rotating speed ωo of the output shaft speed 32 or the vehicle running speed.

The automatic transmission 14 used in the embodiment has a plurality of driving positions. However, the automatic transmission 14 may be replaced by a continuously variable transmission, a speed reducing gear device adapted to reduce the input speed at a predetermined ratio, or a manual transmission whose drive positions are changed by manual operation of a shift lever by the vehicle driver.

It is also to be understood that the present invention may be embodied with various other changes, modifications and improvements which occur to those skilled in the art, without departing from the spirit and scope of the invention defined in the following claims.

What is claimed is:

1. An apparatus for controlling a clutch of a motor vehicle connected to an engine and having a driving and a driven rotating member for transmitting and cutting an output of the engine, said apparatus being capable of controlling an amount of slip of said clutch during starting of the vehicle, said apparatus comprising:

engine torque determining means for determining a torque of said engine;

clutch speed monitoring means for determining whether a speed of said driven rotating member has been raised to a level substantially equal to a speed of said engine;

first slip control means for controlling the amount of slip of said clutch such that a clutch torque to be transmitted through said clutch is smaller than said engine torque by a predetermined first amount, before said clutch speed monitoring means determines that said speed of said driven rotating member has been raised to said level substantially equal to said speed of said engine; and fully engaging means for fully engaging said clutch when said clutch speed monitoring means determines that said speed of said driven rotating member has been raised to said level.

2. An apparatus according to claim 1, wherein said first slip control means comprises means for determining said predetermined first amount such that said predetermined first amount corresponds to a desired acceleration value of the engine which permits said speed of said engine to be increased while said speed of said driven rotating member of the clutch is increased toward said speed of said engine.

3. An apparatus according to claim 1, wherein said vehicle includes an automatic transmission having an input shaft connected to said driven rotating member of said clutch, said clutch speed monitoring means comprising a sensor for detecting the speed of the engine and a sensor for detecting a speed of said input shaft as said speed of said driven member.

4. An apparatus according to claim 1, further comprising vehicle start determining means for determining whether the vehicle is in the process of starting, said first slip control means and said fully engaging means being operable after said vehicle start determining means determines that the vehicle is in the process of starting.

5. An apparatus according to claim 1, further comprising:

time lapse determining means for determining whether a predetermined second time has passed after an operation of said first slip control means is initiated; and second slip control means for controlling the amount of slip of said clutch such that said clutch torque is larger than said engine torque by a predetermined second amount when said time lapse determining means determines that said predetermined second time has passed.

6. An apparatus according to claim 5, wherein said second slip control means comprises means for determining said predetermined second amount such that said predetermined second amount corresponds to a desired deceleration value of the engine which permits said speed of said driven rotating member to be rapidly increased to said speed of said engine.

7. An apparatus for controlling a clutch of a motor vehicle according to claim 1, further comprising:

engine speed monitoring means for determining whether said speed of said engine has been lowered below a predetermined lower limit while said clutch is controlled by said second slip control means; and third slip control means for controlling the amount of slip of said clutch such that said clutch torque is substantially equal to said engine torque after said engine speed monitoring means determines that said speed of said engine has been lowered below said predetermined lower limit.

8. An apparatus according to claim 1, further comprising:

target engine acceleration calculating means for calculating a target acceleration of the engine on the basis of said engine torque and said clutch torque;

actual engine acceleration obtaining means for obtaining an actual acceleration of the engine; and adjusting means for adjusting a drive force for partially engaging said clutch, so as to zero an error between said target acceleration and said actual acceleration of the engine.

9. An apparatus for controlling a clutch of a motor vehicle connected to an engine and having a driving and a driven rotating member for transmitting and cutting an output of the engine, said apparatus being capable of controlling an amount of slip of said clutch during starting of the vehicle, said apparatus comprising:

engine torque determining means for determining a torque of said engine;

clutch speed monitoring means for determining whether a speed of said driven rotating member has been raised to a level substantially equal to a speed of said engine;

first slip control means for controlling the amount of slip of said clutch such that a clutch torque to be transmitted through said clutch is smaller than said engine torque by a predetermined first amount, during an initial first period before said clutch speed monitoring means determines that said speed of said driven rotating member has been raised to said level;

time lapse determining means for determining whether said initial first period has expired;

second slip control means, responsive to said time lapse determining means, for controlling the amount of slip of said clutch such that said clutch torque is larger than said engine torque by a predetermined second amount during a second period following said initial first period before said clutch speed monitoring means determines that said speed of said driven rotating member has been raised to said level; and fully engaging means for fully engaging said clutch when said clutch speed monitoring means determines that said speed of said driven rotating member has been raised to said level.

10. An apparatus according to claim 9, wherein said first slip control means comprises means for determining said predetermined second amount such that said predetermined second amount corresponds to a desired acceleration value of the engine which permits the speed of said engine to be increased while the speed of said driven rotating member of said clutch is increased toward said speed of said engine during said initial first period, and said second slip control means comprises means for determining said predetermined second amount such that said predetermined second amount corresponds to a desired deceleration value of said engine which permits the speed of said driven rotating member to be rapidly increased up to the speed of said engine during said second period.

11. An apparatus according to claim 9, further comprising:

engine speed monitoring means for determining whether said speed of said engine has been lowered below a predetermined lower limit while said clutch is controlled by said second slip control means during said second period; and third slip control means for controlling the amount of slip of said clutch such that said clutch torque is substantially equal to said engine torque after said engine speed monitoring means determines that the speed of said engine has been lowered below said predetermined lower limit.

* * * * *